United States Patent [19]
Cemenska et al.

[11] Patent Number: 4,800,721
[45] Date of Patent: Jan. 31, 1989

[54] FORCE FEEDBACK LEVER

[75] Inventors: Richard A. Cemenska, Edelstein; Marvin P. Schneider; Thomas J. Buege, both of Peoria, all of Ill.

[73] Assignee: Caterpillar Inc., Peoria, Ill.

[21] Appl. No.: 14,734

[22] Filed: Feb. 13, 1987

[51] Int. Cl.$^4$ .................. B64C 13/46; F15B 17/02
[52] U.S. Cl. ............................. 60/393; 74/491; 244/223; 364/190
[58] Field of Search ............ 60/390, 393; 74/491; 244/223, 228; 91/434; 318/628, 689; 364/190; 434/45

[56] References Cited

U.S. PATENT DOCUMENTS

| | | | |
|---|---|---|---|
| 2,544,286 | 3/1951 | Tanner | 318/628 X |
| 2,760,739 | 8/1956 | Reichert | 91/434 X |
| 3,098,412 | 7/1963 | Reitman | 91/434 X |
| 3,686,935 | 8/1972 | May | 73/118.1 X |
| 4,294,162 | 10/1981 | Fowler et al. | 91/434 |
| 4,489,551 | 12/1984 | Watanabe et al. | 60/390 X |
| 4,513,235 | 4/1985 | Acklam et al. | 244/223 X |
| 4,516,063 | 5/1985 | Kaye et al. | 244/223 X |
| 4,580,210 | 4/1986 | Nordstrom | 244/223 X |
| 4,598,890 | 7/1986 | Herzog et al. | 244/223 X |
| 4,630,685 | 12/1986 | Huck et al. | 73/505 X |

FOREIGN PATENT DOCUMENTS 139316 10/1981 Japan ................................ 91/434

Primary Examiner—Robert E. Garrett
Assistant Examiner—George Kapsalas
Attorney, Agent, or Firm—Terry D. Morgan; Robert E. Muir

[57] ABSTRACT

A control lever is provided for effecting positional control of a work implement. An actuator means applies a force to the control lever in response to a sensed load being applied to the work implement. The force applied to the implement control lever is in proportion to the load being applied to the work implement, thereby giving the operator a feel for the load being applied to the implement.

11 Claims, 6 Drawing Sheets

FORCE FEEDBACK LEVER

BACKGROUND OF THE INVENTION

1. Field of the Invention

This invention relates generally to an apparatus for electronically controlling the position of a work implement and more particularly to an apparatus for delivering a feedback signal indicative of the load applied to the work implement.

2. Description of the Prior Art

In the field of earthmoving, contractors typically own and operate a fleet of heavy equipment vehicles which constitute a large capital investment. The method of operation of these vehicles has a tremendous impact on the profitability of the business. For example, operation of the vehicles by an experienced and skilled workforce yields high productivity and efficiency and is favorably reflected in lower operating costs. Conversely, less skilled or new workers will invariably operate at a lower efficiency. Moreover, even skilled operators will experience periods of low productivity owing to outside factors such as fatigue, health, boredom, etc.

The lack of experience and skill are most evident in the larger vehicles where the ability to move tremendous amounts of earth is present. In such vehicles the operator is far removed from the actual work performed, having a limited view of the work implement and being insulated by the sheer mass of the vehicle from the force applied at the work implement. Engine rpm is also a good indicator of vehicle performance and can be easily monitored by engine sound; however, with the advent of better working conditions through enclosed air conditioned cabs, engine noise has become a much more subtle indicator. In these cases tachometers are useful in monitoring engine speed, but such visual indicators are impossible to constantly monitor as the operator's attention must be primarily focused on the work area. Further, while the operator's view of the work implement is limited, some information on efficiency can be visually gathered (i.e. the magnitude of side spill). Thus, the information obtained from the tachometer is at least partially offset by the loss of other visual information.

The present invention is directed to overcoming one or more of the problems as set forth above. In particular, it is desirable to provide an accurate indication of vehicle performance which is not distracting to the overall operation of the vehicle and is a substitute or aid to the subtle indications used by experienced and skilled operators.

SUMMARY OF THE INVENTION

In one aspect of the present invention, a force feedback control lever is provided for effecting positional control of a work implement. The force feedback control lever comprises a manually positionable control lever having a preselected range of movement in at least one plane, a sensor connected to and moveable with the manually positionable control lever and adapted for delivering a first signal having a magnitude responsive to the position of the control lever, means for sensing the load applied to the work implement and delivering a second signal having a magnitude responsive thereto actuator means for applying a force of a preselected variable magnitude to the manually positionable control lever responsive to the magnitude of a received control signal, and means for receiving the first and second signals and delivering a control signal to the actuator means having a magnitude responsive to the magnitudes of the first and second signals.

BEST MODE FOR CARRYING OUT THE INVENTION

Figure 1:
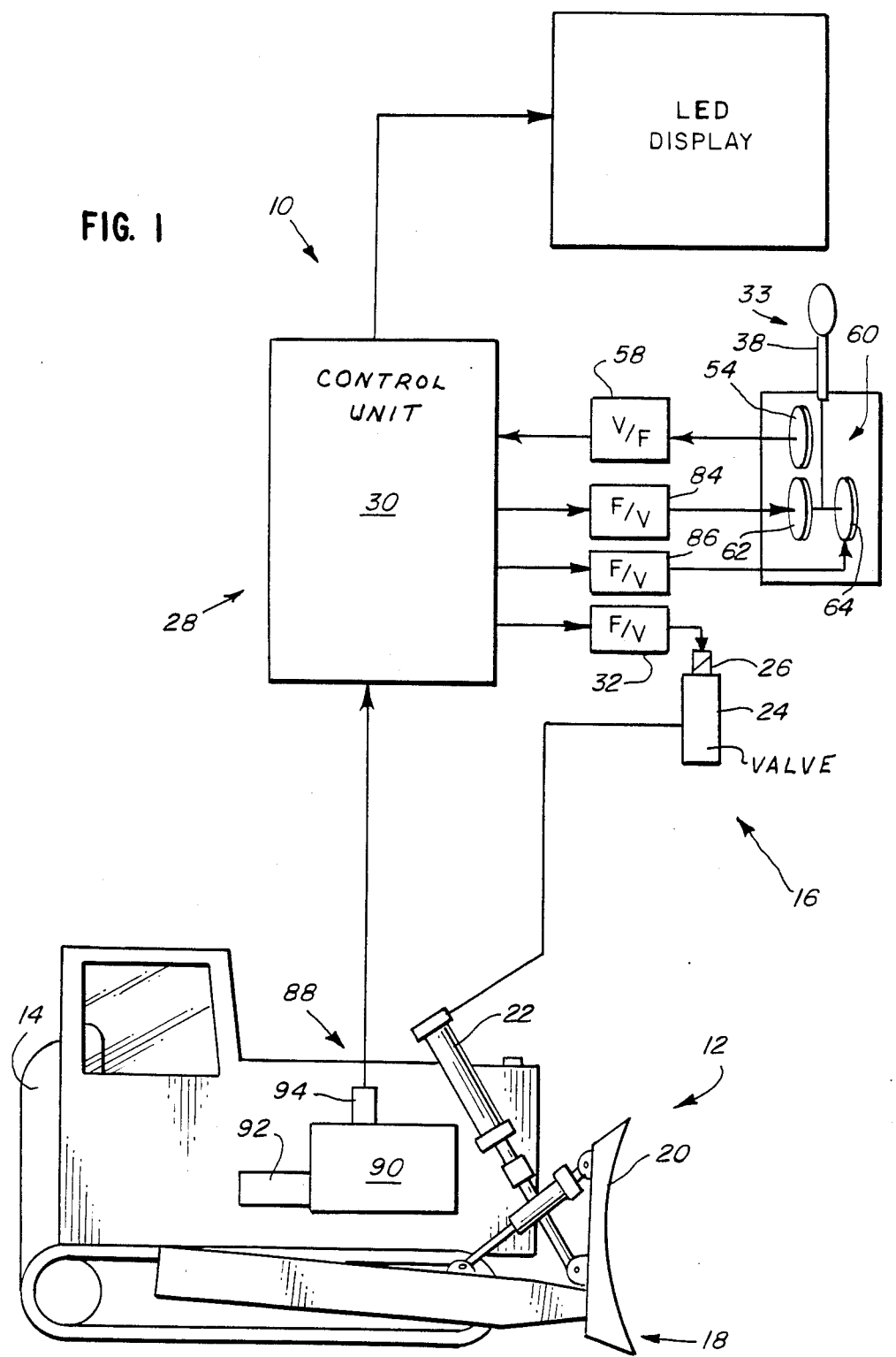
FIG. 1 illustrates a block diagram of one embodiment of the apparatus.

Referring now to the drawings, wherein a preferred embodiment of the apparatus 10 is shown, FIG. 1 illustrates a block diagram of the apparatus 10 relative to a vehicle 12, such as a bulldozer 14. A force feedback control lever 16 effects positional control of a work implement 18, which can be, for example, a bulldozer blade 20. Positional changes of the blade 20 are made via a hydraulic cylinder 22 and an electrohydraulic valve 24. The valve 24 includes a coil 26 alternately energizable in opposing directions to effect movement of a spool (not shown) within the valve 24. The spool is constructed to controllably direct hydraulic fluid flow through the cylinder 22 in opposite directions whereby the blade 20 is appropriately raised or lowered.

Energization of the coil 26 is ultimately directed by a central control unit 28. The control unit 28 is of conventional electronic design and includes a microprocessor 30 operating under software control described in conjunction with the flowchart illustrated in FIG. 5. Naturally, the control unit 28 operates using digital technology and must, therefore, use a digital to analog converter (D/A). The type of D/A used here to deliver a controllable analog signal to the coil 26 is a frequency to voltage converter (F/V). The F/V is also of conventional design and commercially available from Analog Devices as part number AD 650.

Figure 2:
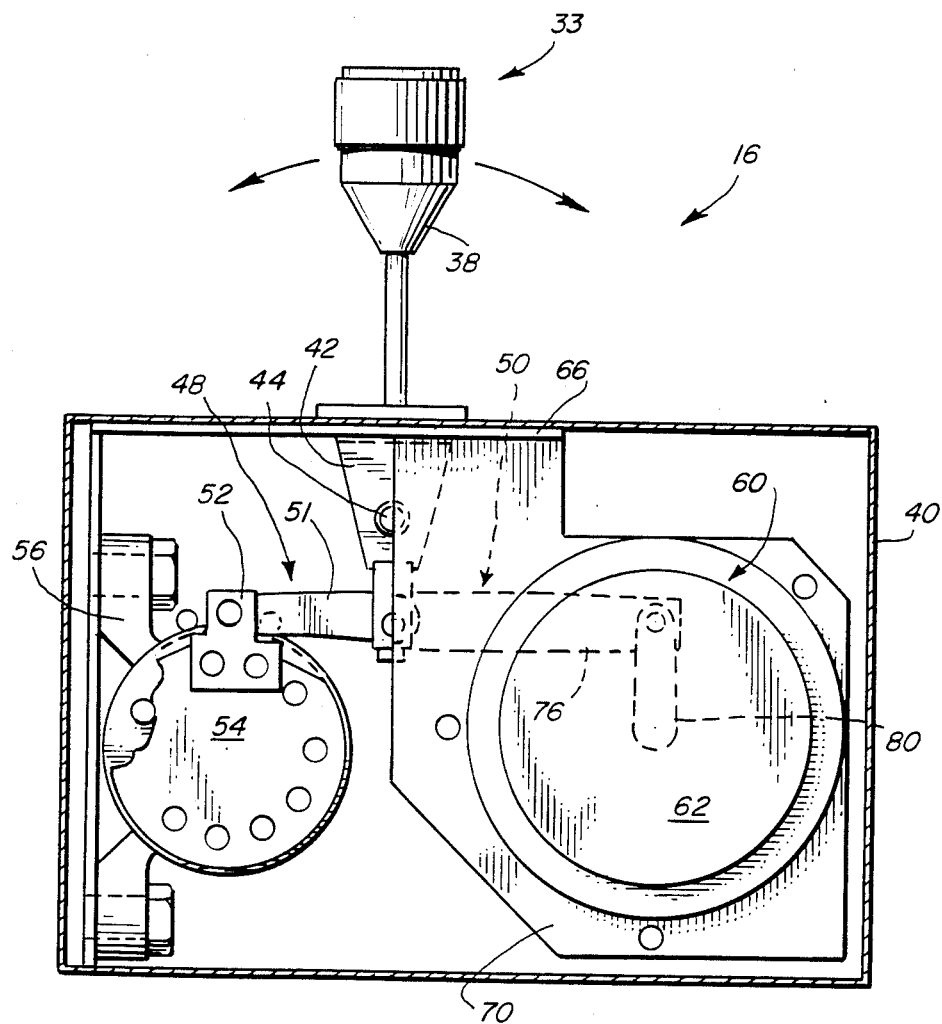
FIG. 2 illustrates a side view of one embodiment of the force feedback handle.
Figure 3:
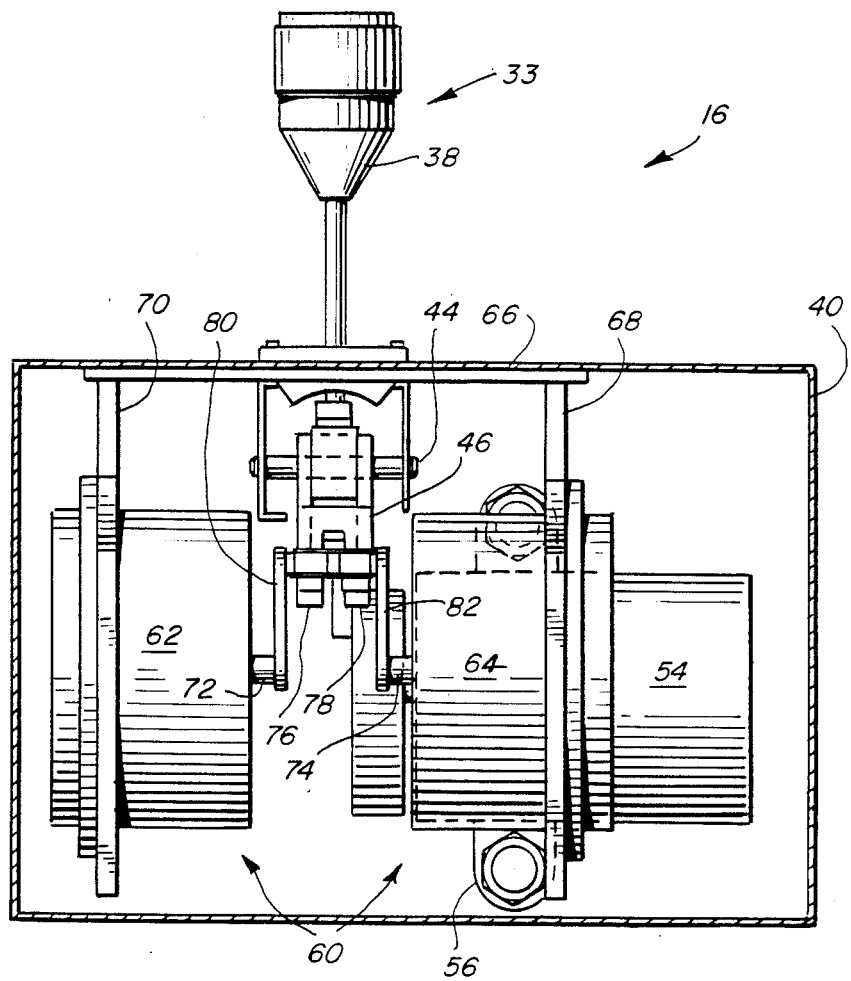
FIG. 3 illustrates an end view of one embodiment of the force feedback handle.

The fore feedback control lever 16 includes a manually positionable lever 33 which has a preselected range of movement in at least one plane and is selectively movable from a neutral position in first and second opposite directions of rotation. A more detailed description of the physical structure of the lever 33 can be had by reference to FIGS. 2 and 3. Reference will be made to both FIGS. 2 and 3 simultaneously while describing the physical structure of the feedback handle 12. Identical element numbers have been assigned to identical parts to avoid undue confusion. The physical structure illustrated herein is intended to exemplify one possible embodiment and is not intended as limiting since structural variations are contemplated which would not depart from the scope of the invention. The lever 33 includes a handle 38 pivotally connected to a housing 40 by a support bracket 42 and pivot pin 44. The handle 38 pivots about the longitudinal axis of the pin 44 in a plane normal to the pin axis. The handle 38 is connected below the support bracket 42 to a bracket 46 which engages fore and aft linkage 48,50. The fore linkage 48 includes a single rectangular shaft 51 pivotally connected at its opposing ends to the bracket 46 and to the movable portion 52 of a sensor 54. The sensor 54 is further connected to the housing 40 via a supporting base 56. Therefore, pivotal movement of the handle 38 results in similar movement of the moveable portion 52 of the sensor 54.

The sensor 54 is connected to and moveable with the manually positionable lever 33 and adapted for delivering a first signal having a magnitude responsive to the position of the lever 33. Digital type sensors are commercially available which could be used; however, owing to availability and vehicle worthiness an analog inductive type sensor, such as that used to detect accelerator pedal position on lift trucks has been implemented. The sensor 54 is electrically connected to the central control unit 28 through a conventional voltage to frequency converter (V/F) 58, such as part number AD 537 available from *Analog Devices*.

An actuator means 60 is also included in the manually positionable control lever 16 and applies a force of a preselected variable magnitude to the handle 38 responsive to the magnitude of a received control signal. The actuator means 60 includes at least one torque motor 62 fixedly connected to and rotatable with the handle 38. In the preferred embodiment, the actuator means includes a second torque motor 64 fixedly connected to and rotatable with the handle 38, whereby force can be applied in either direction of movement afforded to the handle 38. Owing to the peculiar nature of torque motors that they can only apply a force in one direction of rotation, two motors are necessary. It is contemplated that other types of actuators may be used which do apply forces in two directions and would only require a single actuator. For example, solenoids, DC motors, and pneumatic or hydraulic cylinders are all capable of performing the requisite task. Torque motors have been selected because of their compactness, ease of control, and ability to deliver the necessary force (4-6 lbs).

The torque motors 62,64 are also connected to the housing 40 via a support bracket 66. The bracket extends across the top of the housing 40 and is connected thereto by the support bracket 42. Arms 68,70 extend vertically into the housing 40 encompassing the periphery of each of the motors 62,64 supporting the motors 62,64 in facing relation, one to the other. The armature shafts 72,74 of each motor 62,64 are connected to the aft linkage 50 such that rotation of either motor will effect pivotal movement of the handle 38. The aft linkage 50 includes a pair of rectangular shafts 76,78 connected at opposing ends to the bracket 46 and through respective links 80,82 to the shafts 72,74 of the torque motors 62,64.

The torque motors 62,64 are also electrically connected to the central control unit 28 via a pair of conventional frequency to voltage converters (F/V) 84,86. The central control unit operates under software control to regulate the current delivered to the torque motors 62,64 and thereby control the magnitude and direction of the force applied to the handle 38.

Means 88 senses the load applied to the work implement 18 and delivers a second signal having a magnitude responsive thereto. The vehicle 12 necessarily includes a prime mover 90 and transmission 92. In the preferred embodiment, the transmission 92 has an automatic range of operation and includes a standard hydraulic torque converter (not shown) interconnecting the prime mover 90 and transmission 92. The load sensing means 88 includes means 94 for sensing the rotational velocity of the prime mover 90 and the transmission 92, comparing the respective velocities, and delivering the second signal having a magnitude responsive to the difference therebetween. The difference in engine and transmission speed has been found to be a good indicator of vehicle loading and accordingly is a reasonable approximation of implement loading. More direct measurement techniques have been contemplated, such as, strain gauges or magnetostrictive material applied to the work implement 18 or to the drive train of the vehicle 12. Such techniques are possible substitutes to the method described herein.

The means 88 includes a pair of conventional speed sensors (not shown), preferably of the inductive type and each disposed in sensing relation to a gear or flywheel of the prime mover 90 and transmission 92. As is standard in the art the frequencies of the signals are indicative of rotational velocity. These signals are ultimately delivered to the central control unit 28 for processing under software control.

Figure 5:
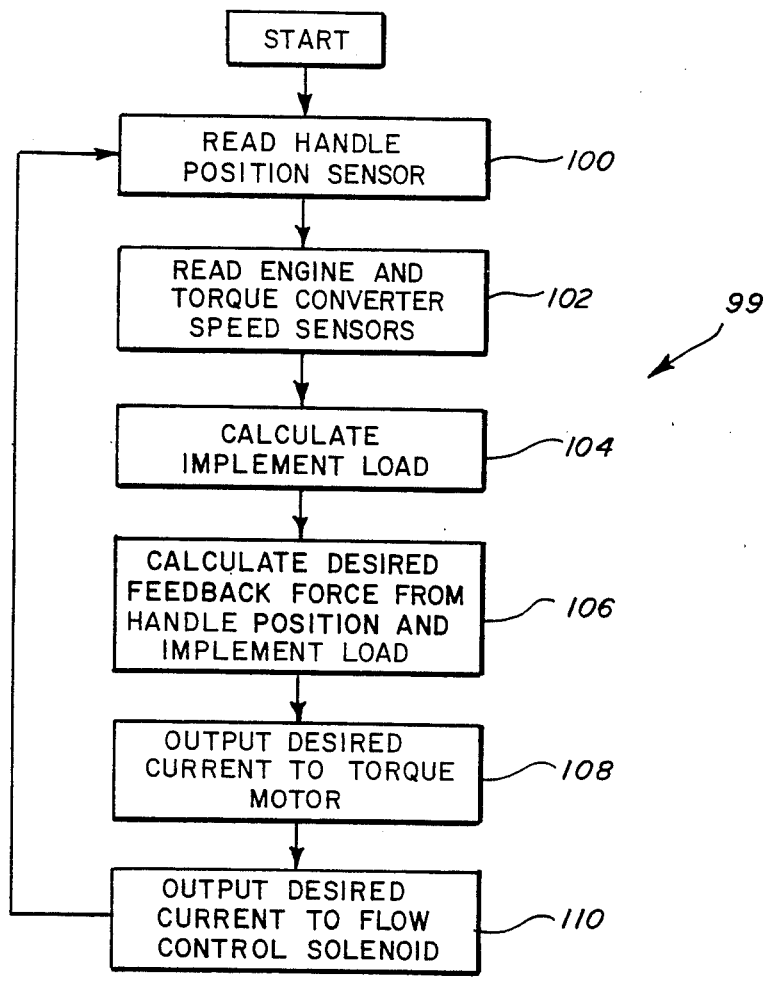
FIG. 5 illustrates one embodiment of a flow chart representation of the software control routine.

Referring now to FIG. 5, wherein a flowchart representation of a portion of the software control subroutine is illustrated, the main control routine periodically calls the subroutine illustrated therein and begins executing at block 100. A means 99 comprised of the subroutine receives the first and second signals and delivers a control signal having a magnitude responsive to the magnitudes of the first and second signals. The control signal is received by the actuator means 60 and the magnitude of the signal determines the force applied to the handle 38. The subroutine first reads the magnitude of the handle position sensor 54 as delivered by the V/F 58. This value is stored in memory and used later in calculating the desired magnitude and direction of the force to be applied to the handle 38. Subsequently, in block 102 the prime mover and transmission speed sensors are also read and stored in memory. In block 104 the approximate load experienced by the work implement 18 is calculated by determining the speed differential of the prime mover 90 and transmission 92. There is a direct relationship between this speed differential and the implement load. Thus, the greater the differential the greater the implement load.

Figure 4A:
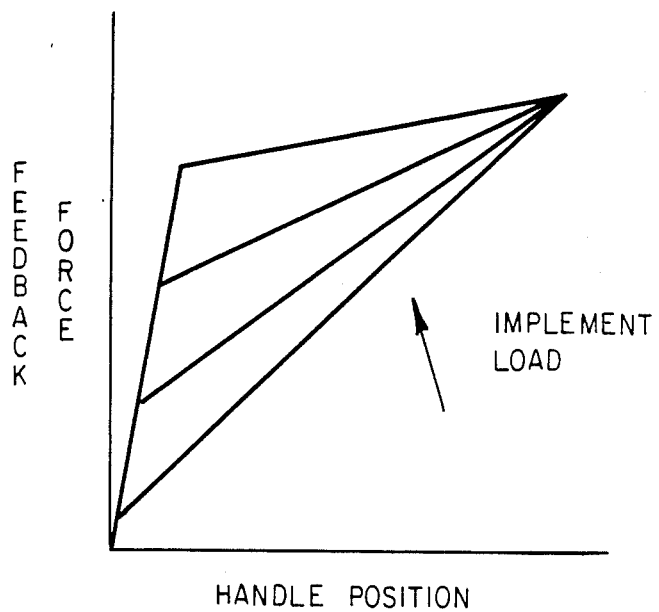
FIG. 4A illustrates one implementation of a graphic representation of handle position versus feedback force as effected by implement load.

A variety of schemes can be used in block 106 to calculate the desired feedback force from the handle position and the implement load. For example, referring to the graphs illustrated in FIGS. 4a,4b and 4c, three different methods are illustrated with each being a desirable implementation for a particular application. First, the graph illustrated in FIG. 4a exemplifies varying feedback force with maximum output where the force feedback is dependent upon implement load below the maximum handle position. At positions less than maximum handle displacement, the force is directly dependant on implement load and handle position.

Figure 4B:
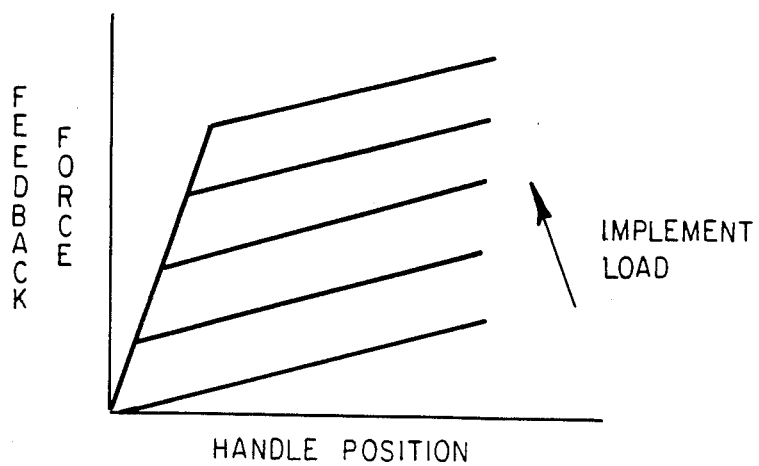
FIG. 4B illustrates another implementation of a graphic representation of handle position versus feedback force as effected by implement load.

Second, the graph illustrated in FIG. 4b exemplifies varying feedback force with varying levels of maximum force. In this mode of control the feedback force is more finely controlled with the feedback force always being dependant upon both handle position and implement load with distinctly detectable variations in force. This control mode provides more information to the operator by subtle variations of the feedback force within the range of available force. With limited experience the operator can detect important variations in implement load.

Figure 4C:
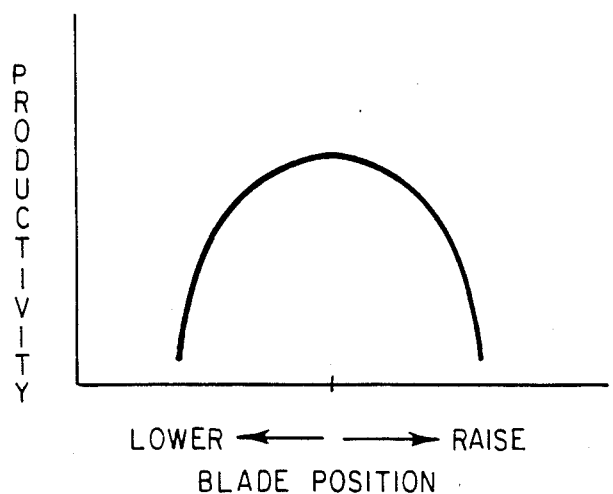
FIG. 4C illustrates another implementation of a graphic representation of handle position versus feedback force as effected by implement load.

Third, the graph illustrated in FIG. 4c exemplifies the automatic control mode. In this mode of operation the apparatus 10 works in conjunction with a second control, such as that described in U.S. Pat. No. 4,630,685 issued Dec. 23, 1986 to Huck et al. The apparatus in Huck controls the bulldozer blade to maintain it in the position of highest productivity by monitoring various parameters, such as, ground speed, longitudinal angular velocity, and blade position. That control attempts to emulate a skilled and experienced operator, but owing to practical limitations in sensing ability and because of unforecasted events, the control will not always operate in the most efficient manner. Accordingly, it would be advantageous to allow the operator to occasionally override the Huck control.

As seen in FIG. 4c the optimum blade position calculated by the Huck control results in peak productivity, while variations in either the raise or lower direction reduces productivity. Accordingly, the optimum blade position is calculated and the deviation is delivered by the Huck control to the central control unit 28 and serves to replace the implement load signal from the means 88. Further, blocks 102 and 104 would be by-passed in this mode and the feedback force would be calculated in block 106 as directly dependent upon blade position deviation. Moreover, because blade 20 deviation may be in either direction, both torque motors 62,64 will be alternately used. If the operator removes his hand from the handle 38 and allows fully automatic operation the handle 38 will be moved by the torque motors 62,64 in the desired direction of operation, thereby causing positional changes in the blade 20. However, with the force applied to the handle 38 being in the 4 to 6 pound range, the operator can easily override movement of the handle by physically holding the handle 38.

Thereafter, in block 108 the desired feedback force is converted to the desired current which must be delivered to the torque motors 62,64 to produce the force. Proper scaling of the desired feedback force results in a digital signal being delivered to one of the F/V's 84,86. Finally, in block 110 the desired hydraulic flow is directly determined from the handle position sensor, converted to the desired current by proper scaling, and delivered to the D/A 32 for controlling the position of the spool in the valve 24.

INDUSTRIAL APPLICABILITY

In the overall operation of the work vehicle 12 assume that the bulldozer 14 is performing work in a standard leveling mode. During such operation it is desirable that the maximum load be transported by the vehicle 12 without excessive slipping of the tracks. Such track slipping results in poor vehicle productivity. Alternatively, transporting loads significantly below the vehicle capacity will also result in poor productivity. Therefore, to aid the operator in determining the magnitude of the load the vehicle is transporting, the apparatus 10 produces a force on the handle in a direction toward a handle 38 position which would reduce the force.

As the operator lowers the work implement 18 and begins to load the blade 20, the apparatus 10 detects the load from the speed differential of the prime mover 90 and transmission 92. In determining the feedback force the apparatus 10 considers not only the implement load, but also the handle 38 position. The theory being that the more aggressively the operator acts, the quicker the vehicle 12 can become seriously overloaded. Thus, by making the force also dependant upon handle position the urgency of situation is effectively communicated. However, the presence of feedback force does not mean that the vehicle is being overloaded, only that the vehicle 12 is being loaded. The feedback force simply serves as an indication of the implement load and the operator must judge what is the appropriate loading level. The apparatus 10 does not operate to control the work implement 18 to an optimal level, but merely aids the operator in determining at what load level the vehicle is operating.

Obviously, in this described mode of operation force is only applied in a single direction (in a direction toward raising the blade 20) and the second torque motor 64 is unnecessary; however, other modes of operation do make use of both torque motors 62,64. For example, in the automatic mode described in conjunction with FIG. 4c, where a desired blade position is continuously monitored by a second control, the apparatus 10 can be used to indicate to the operator when he should raise or lower the blade 20 to maintain the desired position. Further, use of the apparatus 10 on other vehicles, such as an excavator where digging can be accomplished by moving the boom in either direction (front shovel or backhoe applications), it is necessary to provide indications of implement load in both directions. Accordingly, the number of torque motors needed is dependent on both the vehicle and the application. Moreover, multiple axis controls may require multiple torque motors.

Other aspects, objects, and advantages of this invention can be obtained from a study of the drawings, the disclosure, and the appended claims.

We claim:

1. A force feedback control lever for effecting positional control of a work implement mounted on a work vehicle having a prime mover and a transmission interconnected by a torque converter, comprising:
   a manually positionable lever having a preselected range of movement in at least one plane;
   a sensor connected to and moveable with the manually positionable lever and adapted for delivering a first signal having a magnitude responsive to the position of the manually positionable lever;
   means for sensing the rotational velocities of both the prime mover and the transmission, determining the difference between the respective rotational velocities, and delivering a second signal having a magnitude responsive to the determined difference, said magnitude being responsive to the load applied to the work implement;
   actuator means for applying a force of a preselected variable magnitude to the manually positionable lever responsive to the magnitude of a received control signal; and
   means for receiving the first and seconds signals and delivering a control signal to the actuator means, the control signal having a magnitude responsive to the magnitudes of the first and second signals.

2. A force feedback control lever, as set forth in claim 1, wherein the actuator means includes at least one torque motor fixedly connected to and rotatable with the manually positionable lever.

3. A force feedback control lever, as set forth in claim 1, wherein the control signal delivering means calculates the magnitude of the control signal as a direct function of the magnitudes of the first and second signals whereby the magnitude of the control signal increases with corresponding increases in the magnitudes of the first and second signals.

4. A force feedback control lever for effecting positional control of a work implement, comprising:
   a manually positionable lever having a preselected range of movement in at least one plane;
   a sensor connected to and moveable with the manually positionable lever and adapted for delivering a first signal having a magnitude responsive to the position of the manually positionable lever;
   means for sensing the load applied to the work implement and delivering a second signal having a magnitude responsive thereto;
   control signal delivering means for calculating a single maximum magnitude for a control signal in response to receiving a maximum first signal and any one of a plurality of second signals, said calculation being adapted to increase said control signal in response to increase in magnitude of both first and second signals; and
   actuator means for applying a force of a preselected variable magnitude to the manually positionable lever responsive to the magnitude of the received control signal.

5. A force feedback control lever for effecting positional control of a work implement as set forth in claim 4, wherein:
   the preselected range of movement of the manually positionable lever is a pivotal movement in first and second directions of rotation within a single plane; and
   the actuator means selectively applies said preselected variable magnitude force to the manually positionable lever in one of the first and second directions of rotation.

6. A force feedback control lever for effecting positional control of a work implement, comprising:
   a manually positionable lever having a preselected range of movement in at least one plane;
   a sensor connected to and moveable with the manually positionable lever and adapted for delivering a first signal having a magnitude responsive to the position of the manually positionable lever;
   means for sensing the load applied to the work implement and delivering a second signal having a magnitude responsive thereto;
   control signal delivering means for calculating one of a plurality of maximum magnitude for a control signal in response to receiving a maximum first signal and any one of a plurality of second signals, said calculation being adapted to increase said control signal in response to increase in magnitude of both first and second signals; and
   actuator means for applying a force of a preselected variable magnitude to the manually positionable lever responsive to the magnitude of the received control signal, 7. A force feedback control lever for effecting positional control of a work implement as set forth in claim 6, wherein:
   the preselected range of movement of the manually positionable lever is a pivotal movement in first and second directions of rotation within a single plane; and
   the actuator means selectively applies said preselected variable magnitude force to the manually positionable lever in one of the first and second directions of rotation.

8. A force feedback control lever for effecting positional control of a work implement, comprising:
   a manually positionable lever having a preselected range of pivotal movement in at least one plane;
   a sensor connected to and moveable with the manually positionable lever and adapted for delivering a first signal having a magnitude responsive to the position of the manually positionable lever;
   means for sensing the load applied to the work implement and delivering a second signal having a magnitude responsive thereto;
   means for receiving the first and second signals and delivering a control signal corresponding to a calculation of an optimum position of the work implement as a direct function of the magnitudes of the first and second signals; and
   actuator means responsive to the control signal for selectively applying a force of a variable magnitude to the manually positionable lever in one of the first and second directions of rotation to optimally position the manually positionable lever.

9. A force feedback control lever for effecting positional control of a work implement as set forth in claim 8, wherein:
   the preselected range of movement of the manually positionable lever is a pivotal movement in first and second directions of rotation within a single plane; and
   the actuator means selectively applies said preselected variable magnitude force to the manually positionable lever in one of the first and second directions of rotation.

10. In an off-highway vehicle having an attached earthworking or materials handling work implement whose position is controlled by a control lever, the improvement comprising a force feedback control lever where the force fed back thereto is calculated as a direct function of the position of the control lever and a load on the work implement, the force feedback control lever including:
   a manually positionable lever having a selected range of movement in at least one plane;
   a electrical sensor connected to and moveable with the manually positionable lever and adapted for delivering a first electrical signal having a magnitude responsive to the position of the manually positionable lever;
   electrical means for sensing the load applied to the work implement and delivering a second electrical signal having a magnitude responsive thereto;
   means for receiving the first and second electrical signals and delivering a control signal having a magnitude responsive to the magnitudes of the first and second electrical signals; and
   an electric motor responsive to the control signal for selectively applying a force of a preselected variable magnitude to the manually positionable lever in one of the first and second directions of rotation, the magnitude of the force being responsive to the magnitude of the received control signal.

11. The combination set forth in claim 10, further including a second electric motor responsive to the control signal for selectively applying a force of a preselected variable magnitude to the manually positionable lever in the other of the first and second directions of rotation, the magnitude of the force being responsive to the magnitude of the received control signal.

* * * * *